UNITED STATES PATENT OFFICE.

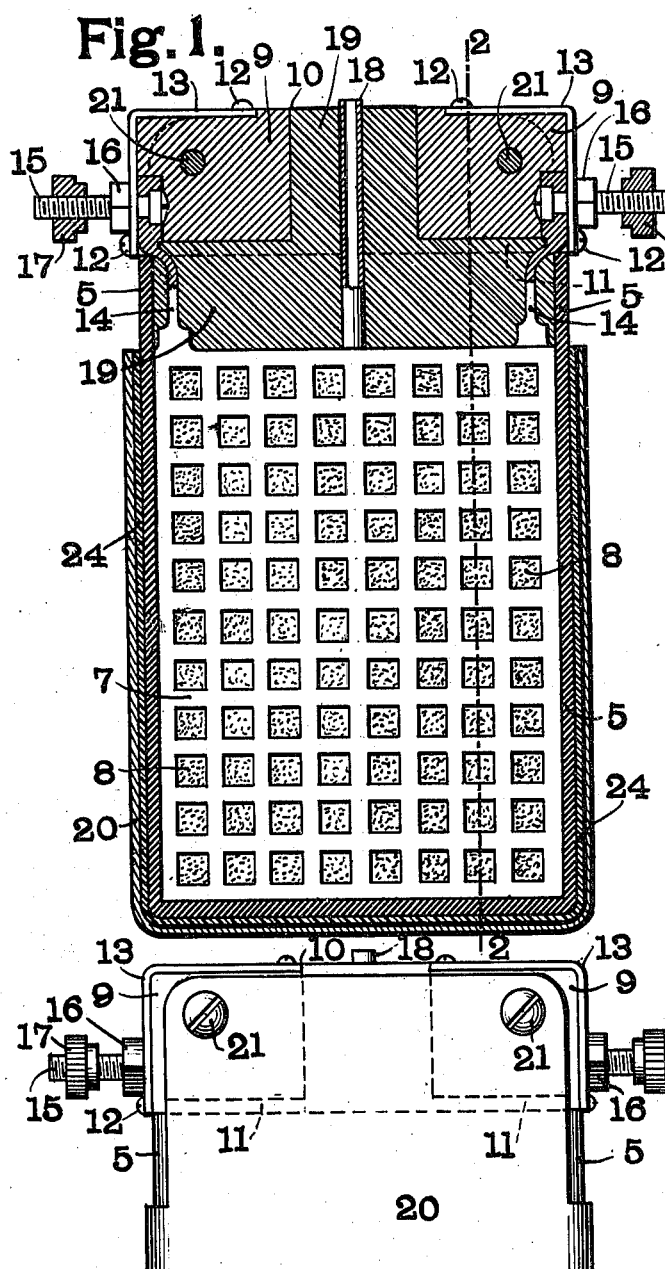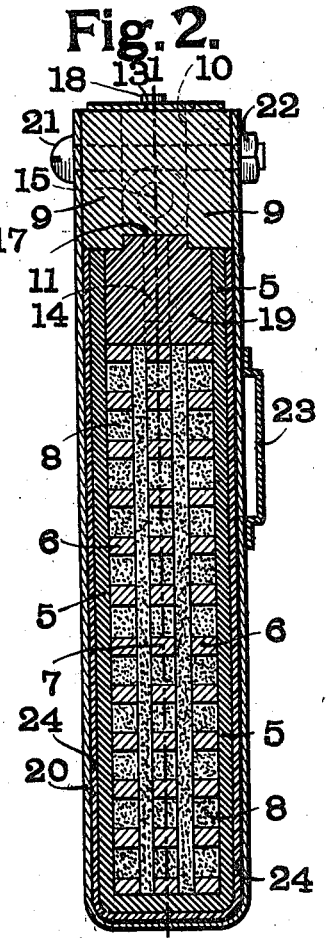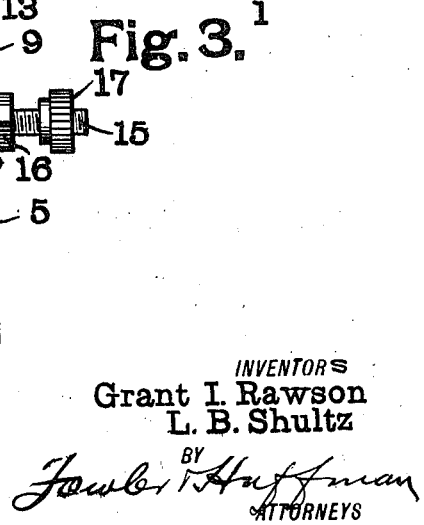

GRANT I. RAWSON AND LLEWELLYN B. SHULTZ, OF ST. LOUIS, MISSOURI, ASSIGNORS TO PILLEY PACKING & FLUE BRUSH MANUFACTURING COMPANY, OF ST. LOUIS, MISSOURI, A CORPORATION OF MISSOURI.

SECONDARY BATTERY.

996,676.  Specification of Letters Patent.  Patented July 4, 1911.

Application filed January 9, 1911. Serial No. 601,522.

*To all whom it may concern:*

Be it known that we, GRANT I. RAWSON and LLEWELLYN B. SHULTZ, citizens of the United States of America, residing at the city of St. Louis, Missouri, have invented a certain new and useful Secondary Battery, of which the following is such a full, clear, and exact description as will enable any one skilled in the art to which it appertains to make and use the same, reference being had to the accompanying drawings, forming part of this specification.

Our invention relates to a secondary battery and more particularly to that form of secondary batteries used to furnish current to miners' lamps. The plates or electrodes of batteries of the class above referred to are usually inclosed in a container formed of hard rubber and the terminals brought out through the walls of said container. We have found in practice that these terminals are liable to break out the walls of the container thus rendering the batteries useless.

The main object of our invention is to overcome the difficulty above referred to.

In the accompanying drawings which illustrate one form of battery made in accordance with our invention Figure 1 is a vertical cross section on the line 1—1 of Fig. 2; Fig. 2 is a section on the line 2—2 of Fig. 1 and Fig. 3 is a side elevation of the upper portion of the battery.

Like marks of reference refer to similar parts in the several views of the drawings.

5 represents the container which is preferably formed of hard rubber. Within the container 5 are situated the plates or electrodes which may be of any suitable number. In the drawings we have shown two negative electrodes 6 between which is situated the positive electrode 7. The electrodes are surrounded by the electrolyte 8.

9 is a block of wood or other suitable insulating material forming a cap for the container 5. This cap 9 is provided with a central opening 10 and also with a groove 11 situated at its lower face. Secured to the ends of the cap 9 by means of screws 12 are angle plates 13. Extending upwardly from the electrodes 6 and 7 are contact strips 14, the upper ends of which are let into suitable recesses in the ends of the cap 9. These strips 14 are secured to the angle plates 13 by means of screws 15. Each of the screws 15 is provided with a locking nut 16 and a clamping nut 17 by means of which the terminal wires from the lamp may be connected. In order to secure good electrical contact between the strips 14 and the screws 15 we prefer to solder the said strips to the screws.

After the cap is placed in position on the container 5 a tube 18 is inserted through the opening 10 in order to allow of liquid being supplied to the battery and also to allow the escape of any gases generated in the battery. After the tube 18 is placed in position a filling 19 of plastic material is inserted into the top of the battery through the opening 10 so as to completely fill the space above the electrodes and also the opening 10. This material is preferably a mixture of asphaltum and resin but any similar plastic material may be used. This plastic material firmly secures the cap 9 in position on the container 5. In order to still further protect the container 5 and secure the parts more firmly in position we provide a sheet metal casing 20 which completely surrounds the container 5 and is provided near its top with openings through which pass bolts 21. These bolts 21 also pass through openings in the cap 9 and are secured in position by means of nuts 22. The casing 20 may be provided with a loop 23, as shown in Fig. 2, for convenience in carrying the battery. In order to more firmly secure the casing 20 to the container 5, we prefer to place between the said parts a lining of material 24, similar to the filling 19 hereinbefore described.

It will be seen that our battery while light and compact in construction is very strong and the terminals cannot be torn loose as is liable to happen when they are brought out through the walls of the hard rubber container 5.

Having fully described our invention, what we claim as new and desire to secure by Letters Patent of the United States, is:

1. In a secondary battery, the combination with electrodes, of a container for the electrodes, a block of insulating material forming a cap for said container and provided with an opening, terminals carried by said cap and connected to said electrodes, and a filling of plastic material filling the opening in said block and the space between said block and electrodes, said filling securing said block to said container.

2. In a secondary battery, the combination with electrodes, of an insulating container for the electrodes, a block of insulating material forming a cap for said container, terminals carried by said cap and connected to said electrodes, a sheet metal casing surrounding said container, a lining of plastic material in said casing, and transverse bolts passing through said casing and cap.

3. In a secondary battery, the combination with electrodes, of a container for the electrodes, a block of insulating material forming a cap for said container, terminals carried by said cap and connected to said electrodes, a filling of plastic material securing said cap to said container, a casing surrounding said container, and means for securing said casing to said cap.

4. In a secondary battery, the combination with electrodes, of a container for the electrodes, a block of insulating material forming a cap for said container, terminals carried by said cap and connected to said electrodes, a filling of plastic material securing said cap to said container, a casing surrounding said container, and transverse bolts passing through said casing and cap.

5. In a secondary battery, the combination with electrodes, a container for said electrodes, a block of insulating material forming a cap for said container, angle plates secured to the ends of said cap, terminals carried by said angle plates and connected to said electrodes, and means for securing said cap to said container.

6. In a secondary battery, the combination with electrodes, of a container for said electrodes, a block of insulating material forming a cap for said container, angle plates secured to the ends of said cap, terminals carried by said angle plates and connected to said electrodes, a casing for said electrodes, and means for securing said casing to said cap.

7. In a secondary battery, the combination with electrodes, of a container for said electrodes, a block of insulating material forming a cap for said container, angle plates secured to the ends of said cap, terminals carried by said angle plates and connected to said electrodes, a filling of plastic material securing said cap to said container, a casing for said container, and transverse bolts securing said casing to said cap.

In testimony whereof, we have hereunto set our hands and affixed our seals in the presence of the two subscribing witnesses.

GRANT I. RAWSON. [L. S.]
LLEWELLYN B. SHULTZ. [L. S.]

Witnesses:
W. A. ALEXANDER,
ELIZABETH BAILEY.